United States Patent
Kirchner et al.

(10) Patent No.: US 8,551,440 B2
(45) Date of Patent: Oct. 8, 2013

(54) LOW SODIUM SEA SALT

(75) Inventors: Alan W. Kirchner, Asheville, NC (US); Alan Fisher, Dallas, GA (US)

(73) Assignee: Ocean's Flavor Foods, LLC, Asheville, NC (US)

( * ) Notice: Subject to any disclaimer, the term of this patent is extended or adjusted under 35 U.S.C. 154(b) by 536 days.

(21) Appl. No.: 12/619,721

(22) Filed: Nov. 17, 2009

(65) Prior Publication Data

US 2010/0062115 A1  Mar. 11, 2010

Related U.S. Application Data

(62) Division of application No. 11/509,901, filed on Aug. 25, 2006, now Pat. No. 7,621,968.

(60) Provisional application No. 60/723,807, filed on Oct. 4, 2005.

(51) Int. Cl.
 *C22B 26/10* (2006.01)

(52) U.S. Cl.
 USPC ........................................ 423/499.4; 423/551

(58) Field of Classification Search
 USPC .............. 23/302 T, 304; 423/499.4, 551, 554, 423/555, 499.5
 See application file for complete search history.

(56) References Cited

U.S. PATENT DOCUMENTS

| | | | |
|---|---|---|---|
| 4,216,244 A | 8/1980 | Allen, Jr. et al. | |
| 4,306,880 A | 12/1981 | Garrett | |
| 4,473,595 A | 9/1984 | Rood et al. | |
| 5,626,904 A * | 5/1997 | Frederiksen | 426/649 |
| 5,871,803 A | 2/1999 | Bonorden et al. | |
| 6,048,569 A | 4/2000 | Garcia et al. | |
| 6,541,050 B1 * | 4/2003 | Bonorden et al. | 426/74 |
| 6,776,972 B2 * | 8/2004 | Vohra et al. | 423/166 |
| 7,014,832 B2 * | 3/2006 | Vohra et al. | 423/499.1 |

FOREIGN PATENT DOCUMENTS

WO   WO 03/035550 A1   5/2003

\* cited by examiner

*Primary Examiner* — Edward Johnson
(74) *Attorney, Agent, or Firm* — The Van Winkle Law Firm; David M. Carter

(57) ABSTRACT

There is provided a low sodium sea salt and a method for producing the same. A first amount of natural seawater containing sodium, chloride, potassium, magnesium, sulfate and other trace minerals is introduced into a containment structure which is periodically exposed to the sun. Preferably, the containment structure is located outdoors in an arid climate with direct exposure to sunlight. An amount of water is evaporated forming a brine. An amount of sodium chloride is crystallized and an amount of the crystallized sodium chloride is removed so that the remaining brine includes substantial amounts of potassium, magnesium and sulfate. A second amount of natural seawater is combined with the remaining brine forming a diluted brine. An amount of water is evaporated from the diluted brine. Sodium chloride, potassium sulfate and magnesium sulfate is crystallized forming a low sodium sea salt whereby the sodium chloride is no more than 70 weight percent.

22 Claims, 3 Drawing Sheets

LOW SODIUM SEA SALT

RELATIONSHIP TO PRIOR APPLICATIONS

This is a U.S. non-provisional application relating to and claiming the benefit of U.S. Provisional Patent Application Ser. No. 60/723,807, filed Oct. 4, 2005 and is a divisional of U.S. application Ser. No. 11/509,901 filed Aug. 25, 2006.

BACKGROUND

Because sea salts include trace minerals which are known to promote good health, there is a substantial demand for sea salts to flavor foods. Sea salts have been produced for centuries using the traditional method of allowing natural seawater to evaporate from shallow ponds located in arid climates. As the natural seawater concentrates, crystals of salt begin to form as the solubility of them decreases. Although very complicated, this process occurs naturally and yields a coveted salt with unique chemistry and properties. The sodium chloride content of these sea salts is typically from 90 to 98%. This is due to the solubility and overwhelming concentration of sodium and chloride found in natural seawater as compared to other components such as magnesium, potassium, and sulfate.

Health concerns have prompted the introduction of low-sodium salts for food use. However, it is believed that existing products are all produced synthetically by blending purified potassium chloride with ordinary table salts to achieve the reduced sodium content. It is desirable to produce a natural sea salt with significantly reduced sodium chloride content, e.g., 30 to 70 weight percent, while maintaining the naturally occurring trace elements found in quality sea salts.

SUMMARY OF THE INVENTION

In accordance with one embodiment of this invention, there is provided a method for producing low sodium sea salt. A first amount of natural seawater containing sodium, chloride, potassium, magnesium, sulfates and other trace minerals is introduced into a containment structure. Preferably, the containment structure is located outdoors in an arid climate with direct exposure to sunlight. The containment structure is periodically exposed to the sun which evaporates some of the water and forms a brine and some of the sodium chloride is crystallized. Some of the sodium chloride is removed. The remaining brine includes substantial amounts of potassium, magnesium and sulfate. A second amount of natural seawater is combined with the remaining brine forming a diluted brine. An amount of water from the diluted brine is evaporated and sodium chloride, potassium sulfate and magnesium sulfate is crystallized forming a low sodium sea salt. The sodium chloride content is no more than 70 weight percent.

In accordance with another embodiment of this invention, there is provided a low sodium sea salt containing a plurality of grains. A substantial amount of the grains contains from 30 to 70 weight percent sodium chloride and substantial amounts of potassium and magnesium sulfates. Preferably, the low sodium sea salt is used to flavor food.

In accordance with yet another form of this invention, there is provided a low sodium sea salt including a plurality of grains. The composition of the grains includes sodium chloride and non-sodium sea salts. The composition of each of the grains is substantially homogeneous. The grains contain from thirty (30) to seventy (70) weight percent of sodium chloride. Preferably, the low sodium sea salt is used to flavor food.

In accordance with yet another embodiment of this invention, there is provided a method for producing a low sodium chloride sea salt. A first amount of natural seawater containing natural amounts of sodium, potassium, magnesium and chloride is introduced into a containment structure. The containment structure is periodically exposed to the sun resulting in the evaporation of an amount of the water from the natural seawater, thus forming a brine. An amount of sodium chloride is crystallized from the brine. Some of the crystallized sodium chloride is removed from the remaining brine, leaving substantial amounts of potassium and magnesium in the remaining brine. A second amount of natural seawater is combined with the remaining brine forming a diluted brine. An amount of water is evaporated from the diluted brine. Sodium, potassium and magnesium salts are crystallized, forming a, preferably homogenous, low sodium sea salt whereby the sodium chloride content is no more than 70 weight percent.

In accordance with another embodiment of this invention, there is provided a low sodium sea salt containing a plurality of grains. The composition of the grains includes sodium chloride and non-sodium salts. The composition of each of the grains is substantially uniform. Each grain contains from thirty (30) to seventy (70) weight percent of sodium chloride. Preferably, the low sodium sea salt is used to flavor food.

BRIEF DESCRIPTION OF THE DRAWINGS

The subject matter which is regarded as the invention is set forth in the independent claims. The invention, however, may be better understood in reference to the accompanying drawings in which:

DESCRIPTION OF THE PREFERRED EMBODIMENTS

The following describes embodiments of processes that result in an all natural sea salt with lower levels of sodium chloride (NaCl) than other sea salts. One process takes natural seawater through natural evaporation and crystallization stages and uses a unique natural method of introducing various elements that are common to natural seawater to form a finished product that has lower NaCl then regular salt formed by the natural process.

When one produces regular salt with NaCl levels in excess of ninety percent (90%) from natural seawater, there is a separation of various minerals, particularly potassium sulfate ($K_2SO_4$), potassium chloride (KCl), magnesium sulfate ($MgSO_4$), magnesium chloride ($MgCl_2$), and other trace minerals. A preferred process uses at least some of these elements in development of a final natural sea salt product produced from natural seawater from a single location.

Figure 1:
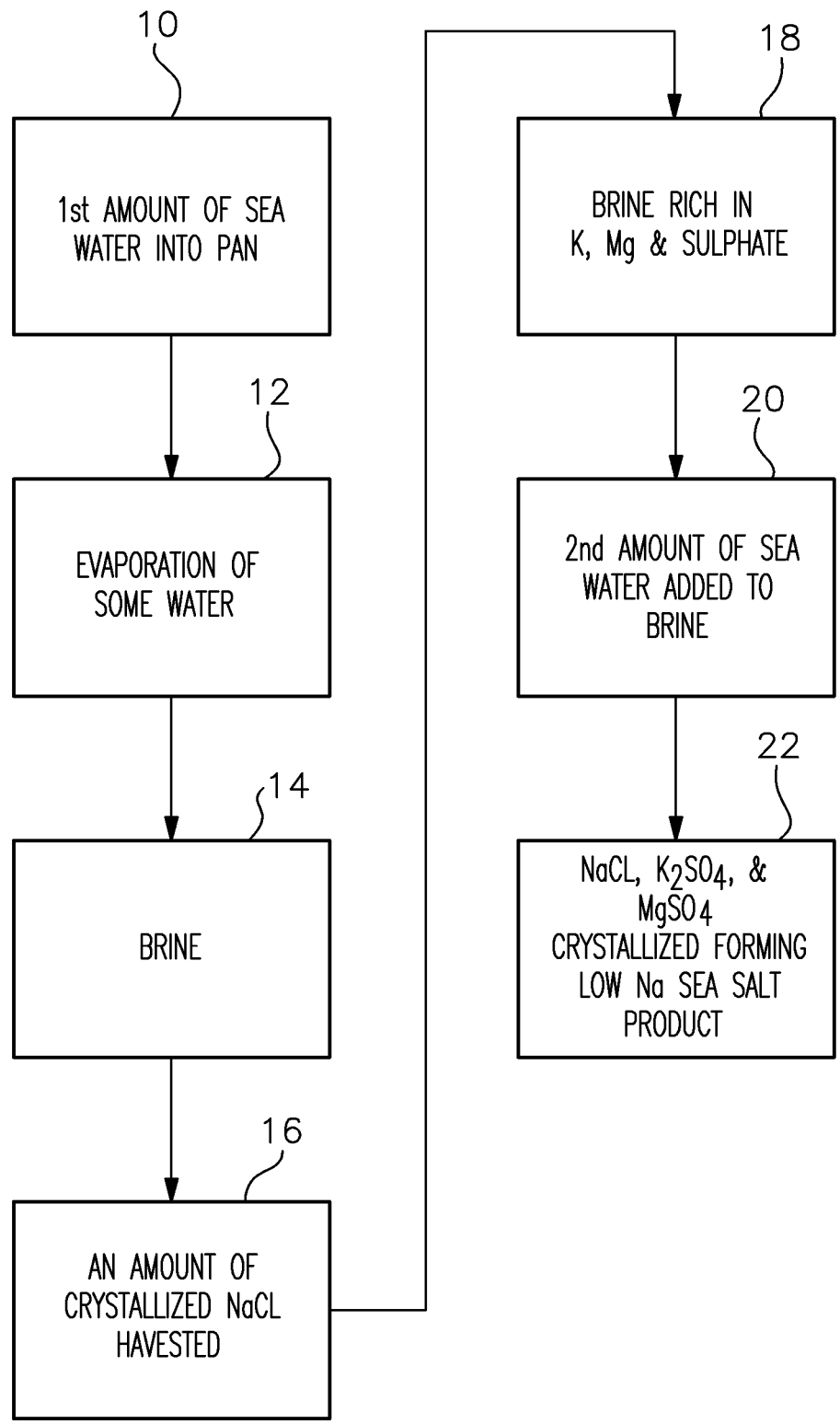
FIG. 1 illustrates a flow chart in block diagram form showing one embodiment of the subject invention.

Referring more particularly to FIG. 1, a first amount of natural seawater is introduced into a containment structure which is often referred to as a pond as illustrated in block 10. Some of the water in the pond evaporates due to exposure to the sun as illustrated in block 12 forming a brine as illustrated in block 14. An amount of the sodium chloride in the natural seawater crystallized and an amount of the crystallized sodium chloride is harvested as illustrated in block 16, resulting in a second brine which is rich in potassium (K), magnesium (Mg) and sulfate ($SO_4$) as illustrated in block 18. A second amount of natural seawater is added to this mineral rich brine as illustrated in block 20. Sodium chloride, potassium sulfate and magnesium sulfate are crystallized due to the exposure to the sun, thereby forming a low sodium sea salt product as illustrated in block 22. This second stage of crystallization yields a salt with dramatically lower sodium chloride levels because of the depletion of some of the sodium chloride which has occurred during the initial stage.

One preferred process begins with the pumping or draining of natural seawater into a series of evaporation ponds, where the natural process of wind and sun will remove water ($H_2O$) and increase the density of the salts and minerals in the solution.

The density of the salts in the natural seawater before entering the first pond could be about four percent (4%) depending on the location of the input channel in relation to the sea.

Once natural seawater reaches the first evaporation pond, the density of the salt brine could range from twenty-five percent (25%) to thirty percent (30%) depending on the wind, rain, sun and general environmental conditions.

When the brine density increases, the concentration of potassium chloride (KCl), magnesium (Mg) and epsomite and other trace minerals becomes more evident and NaCl begins to separate.

The liquid containing high levels of NaCl is drained (pumped) to separate some of the NaCl from other salts and minerals and the remaining liquid is processed using the evaporation technique to determine the make up of the low NaCl end product. During this time, the degree of NaCl in relation to other elements is completed.

Use of the various elements that comprise natural seawater, which are preferably not blended but are formed by timely movement of the various brines between evaporation and crystallization ponds, a preferred composition is developed that provides the final low sodium product. The limits on the percentage of NaCl are generally governed by concentration and the process of developing the concentration of the various elements. Certain positioning of the ponds that can receive the brine for other ponds helps allow the low sodium product to naturally develop.

Once the product is completed to the point of crystallization with the proper moisture content and general structure of regular scale, the grinding and sizing process is the same as production of regular salt that comes directly from natural seawater.

Figure 2:
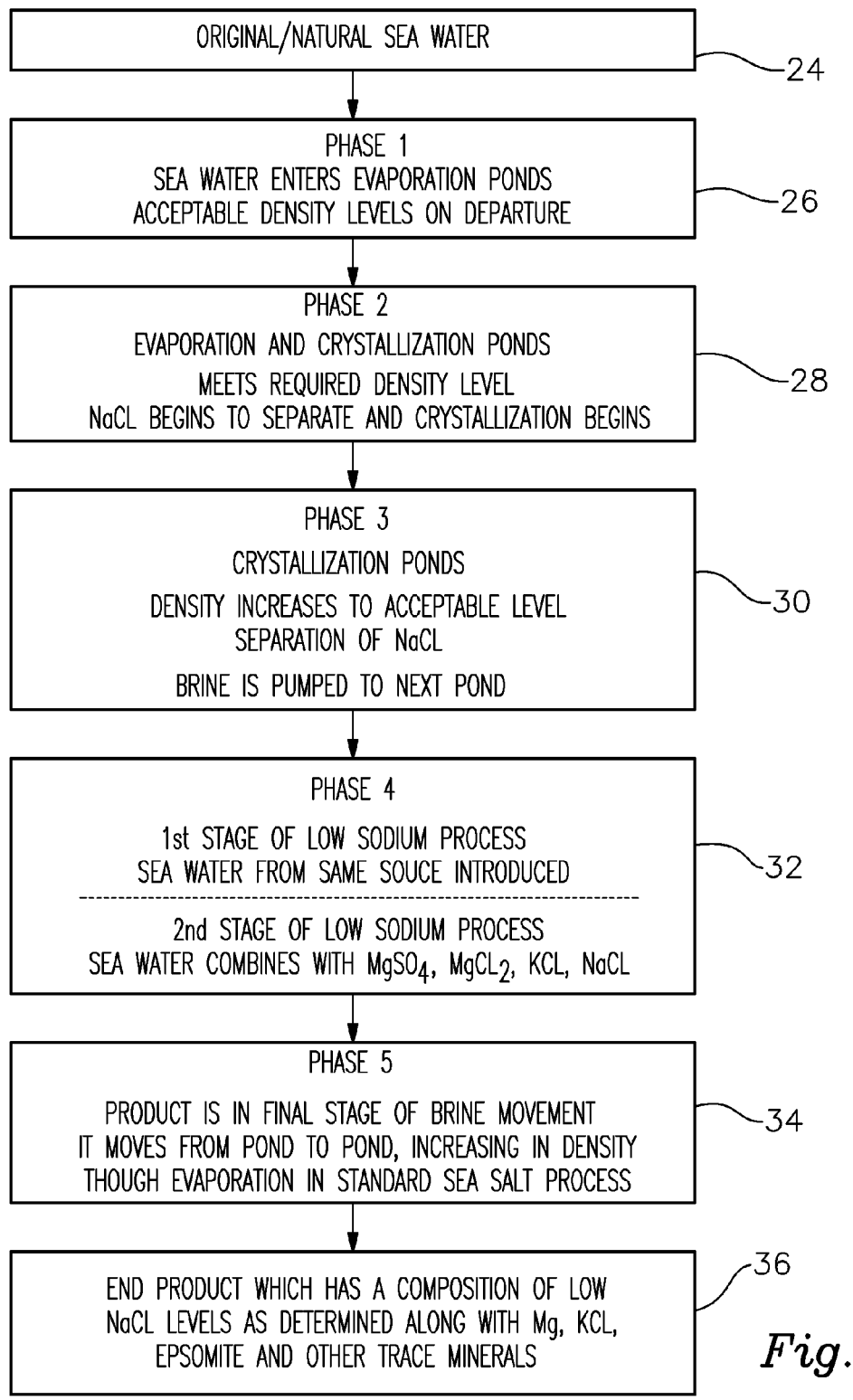
FIG. 2 illustrates a flow chart in block diagram form showing another embodiment of the subject invention.

FIG. 2 illustrates another preferred embodiment of the invention. As shown in blocks 24 and 26, natural seawater is first introduced into evaporation ponds. The sodium in the natural seawater flow is carefully monitored as it moves through the many ponds depending on the various minerals and density levels. As illustrated in block 28, the brine enters evaporation and crystallization ponds and is assessed so that one knows that it meets required density levels. Sodium chloride begins to separate and crystallization begins. As illustrated in block 30, the brine enters crystallization ponds. The density increases to acceptable levels. Sodium chloride begins to separate. The brine, less the separated sodium chloride, is then pumped into the next pond. As illustrated in block 32, which is a stage of the low sodium process, additional natural seawater from the same source is introduced and the natural seawater combines with the magnesium sulfate, magnesium chloride, potassium chloride and sodium chloride. As illustrated in block 34, the product is in the final stage of brine movement. It then moves from pond to pond increasing the density through evaporation in the standard sea salt process. As illustrated in block 36, the end product is a composition having low sodium chloride levels along with magnesium, potassium chloride, epsomite and other trace minerals.

The final product has a balance of the various elements to meet the required analysis for low sodium all natural sea salt.

The following is another embodiment of a process for producing low sodium salt from natural seawater. A first amount of natural seawater which contains various salts and other minerals is introduced into ponds. Some of the water is evaporated and portions of the various salts, which are mostly sodium chloride, are crystallized. Amounts of sodium chloride are removed after crystallization. The remaining liquid contains a higher concentration of non-sodium salts than that which is contained in natural seawater. The non-sodium salts are combined with a second amount of natural seawater to form a solution containing a higher concentration of non-sodium salts. The water is evaporated from the solution. The sodium salts and the non-sodium salts are crystallized forming grains containing both the sodium and non-sodium salts. The salt grains are harvested, yielding a product which is low in sodium chloride.

It is believed that the above described processes will produce a salt product having sodium chloride in the range of thirty weight percent to seventy weight percent and a preferred range of sodium chloride between forty weight percent and sixty weight percent.

The resulting low sodium sea salt includes a plurality of grains. The grains contain from 30 to 70 weight percent NaCl and substantial amounts of potassium and magnesium sulfates. Preferably, the amount of $K_2SO_4$ is between 14 and 31 weight percent and the amount of $MgSO_4$ is between 10 and 22 weight percent. A low sodium sea salt has been produced using methods described herein containing approximately 49 weight percent NaCl, 14.6 weight percent $MgSO_4$, and 21 weight percent $K_2SO_4$.

Since the low sodium salt forms directly from the brine, the grains are uniform in composition unlike a synthetic blended product that contains a mixture of table salt or ordinary sea salt (high in NaCl) and purified potassium chloride. The low sodium salt has very similar chemistry, including the trace element profile, to traditionally produced sea salts but with dramatically less sodium chloride levels. Additionally, the potassium, magnesium and sulfate levels are substantially elevated to compensate for the reduced sodium chloride levels.

The unique, low sodium grains are very homogeneous and therefore exhibit dramatically different solubility properties than those of the synthetic low sodium salts. Specifically, they dissolve more slowly and have less of a cooling effect during solubilization in water, both of which positively effect mouth-feel and ultimately taste.

Figure 3:
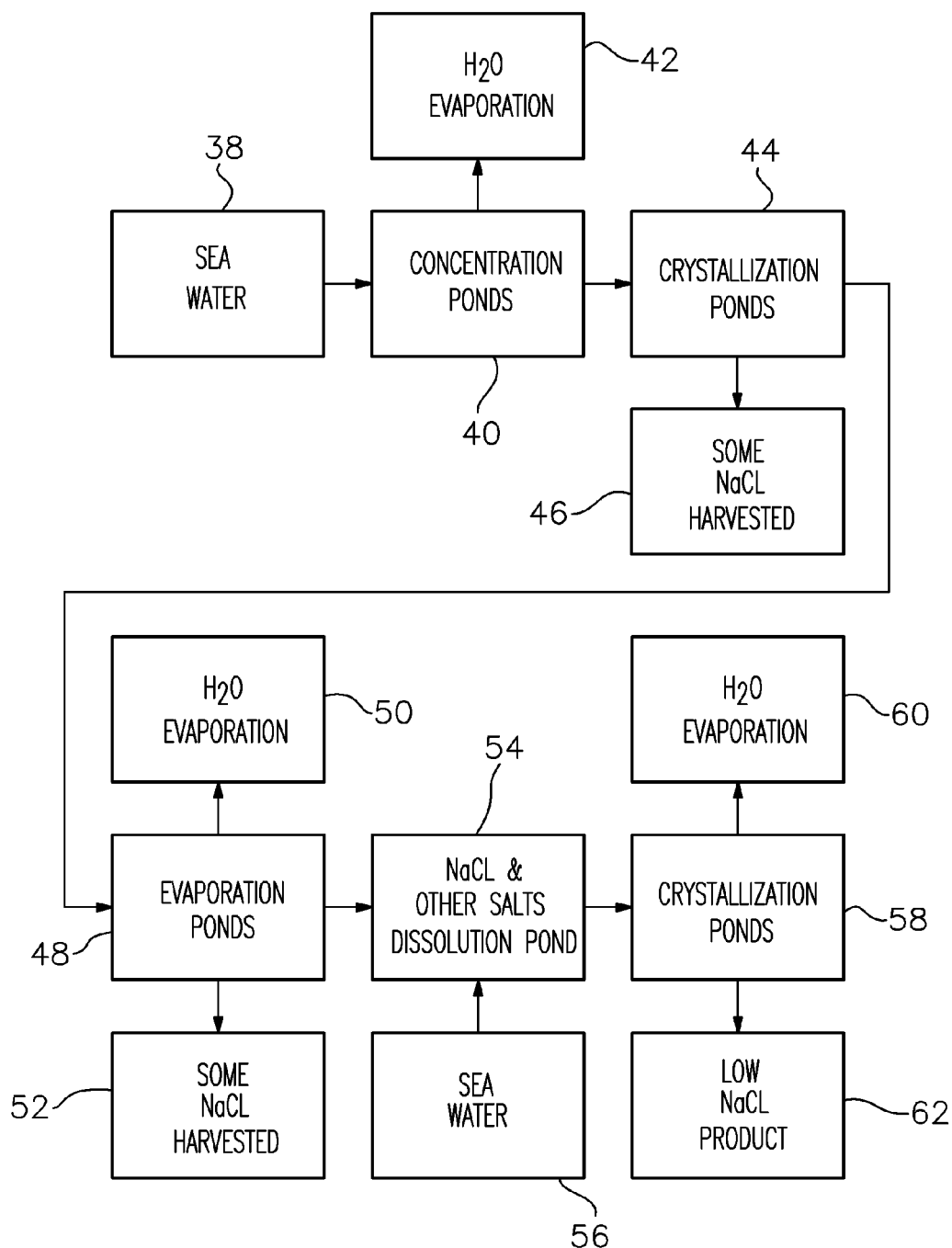
FIG. 3 illustrates a flow chart in block diagram form showing another embodiment of the invention.

FIG. 3 shows a flow chart in block diagram form illustrating another preferred embodiment of the invention. As illustrated in blocks 38 and 40, natural seawater is introduced into concentration ponds. As illustrated in block 42, water evaporates from these ponds due to exposure to the sun. The concentrated liquid then flows to crystallization ponds as illustrated in block 44. Some of the sodium chloride is harvested from the crystallization ponds as illustrated in block 46. The reduced sodium chloride brine then enters evaporation ponds as illustrated in block 48. Additional water evaporates as illustrated in block 50. Additional crystallized sodium chloride is harvested as illustrated in block 52. The brine containing a lesser amount of sodium chloride but with other salts and minerals then proceeds to a dissolution pond as illustrated in block 54. Natural seawater is added to the dissolution pond as illustrated by block 56. The material then proceeds to crystallization ponds 58. More water is evaporated as illustrated in block 60. The material is harvested thereby yielding a low sodium chloride product as illustrated in block 62.

While the invention has been described in terms of the above embodiments, those skilled in the art will recognize that the invention can be practiced with modification within the spirit and scope of the appended claims.

The invention claimed is:

1. A low sodium sea salt comprising;
   a plurality of grains; and
   a substantial amount of said grains containing 30 to 70 weight percent of sodium chloride and substantial amounts of potassium sulfate and magnesium sulfate.

2. A low sodium sea salt as set forth in claim 1 wherein said substantial amount of said grains contains from 40 to 60 weight percent of sodium chloride.

3. A low sodium sea salt as set forth in claim 1 wherein the amount of potassium sulfate is in the range between 14 and 31 weight percent and the amount of magnesium sulfate is in the range between 10 and 22 weight percent.

4. A low sodium sea salt as set forth in claim 1 wherein said substantial amounts of said grains include trace amounts of other salts and minerals.

5. A low sodium sea salt comprising:
   a plurality of grains;
   the composition of a substantial number of said grains includes sodium chloride and non sodium salts;
   the composition of the substantial number of said grains being substantially uniform; and
   the substantial number of said grains containing from 30 to 70 weight percent of sodium chloride.

6. A low sodium sea salt as set forth in claim 5 wherein the non sodium salts include potassium sulfate and magnesium sulfate.

7. A low sodium sea salt as set forth in claim 5 wherein the weight percent of sodium chloride is between 40 and 60 percent.

8. A low sodium sea salt as set forth in claim 6 wherein the weight percent of potassium sulfate is between 14 and 31 percent.

9. A low sodium sea salt as set forth in claim 8 wherein the weight percent of magnesium sulfate is between 10 and 22 percent.

10. A low sodium sea salt as set forth in claim 5 wherein said substantial number of said grains include trace amounts of minerals.

11. A low sodium sea salt as set forth in claim 5 wherein the grains are homogeneous.

12. A low sodium sea salt comprising:
    a plurality of grains;
    the composition of a substantial number of said grains includes sodium chloride and non-sodium sea salts;
    the composition of the substantial number of said grains being substantially homogeneous; and
    the substantial number of said grains containing from 30 to 70 weight percent of sodium chloride.

13. A low sodium sea salt as set forth in claim 12 wherein said grains contain from 40 to 60 weight percent of sodium chloride.

14. A low sodium sea salt as set forth in claim 12 wherein the non-sodium sea salts include potassium sulfate and magnesium sulfate.

15. A low sodium sea salt as set forth in claim 14 wherein the range of potassium sulfate is between 14 and 31 weight percent and the range of magnesium sulfate is between 10 and 22 weight percent.

16. A low sodium sea salt as set forth in claim 12 wherein said substantial number of said grains include trace amounts of other salts and minerals.

17. A method of using low sodium sea salt as set forth in claim 1 further including applying an amount of the low sodium sea salt to food to flavor the food.

18. A food product of claim 1 wherein the low sodium sea salt is a food flavoring agent.

19. A method of using low sodium sea salt as set forth in claim 5 further including applying an amount of the low sodium sea salt to food to flavor the food.

20. A food product of claim 5 wherein the low sodium sea salt is a food flavoring agent.

21. A method of using low sodium sea salt as set forth in claim 12 further including applying an amount of the low sodium sea salt to food to flavor the food.

22. A food product of claim 12 wherein the low sodium sea salt is a food flavoring agent.

* * * * *